(12) United States Patent
Ha et al.

(10) Patent No.: US 12,509,050 B2
(45) Date of Patent: Dec. 30, 2025

(54) APPARATUS FOR SENSING DISPLACEMENT OF BRAKE PEDAL

(71) Applicant: HYUNDAI MOBIS CO., LTD., Seoul (KR)

(72) Inventors: Chan Jun Ha, Yongin-si (KR); Ju Ho Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 161 days.

(21) Appl. No.: 18/454,941

(22) Filed: Aug. 24, 2023

(65) Prior Publication Data

US 2024/0101096 A1 Mar. 28, 2024

(30) Foreign Application Priority Data

Sep. 26, 2022 (KR) ........................ 10-2022-0121650

(51) Int. Cl.
*B60T 17/22* (2006.01)
*G01D 5/14* (2006.01)

(52) U.S. Cl.
CPC .............. *B60T 17/22* (2013.01); *G01D 5/145* (2013.01); *B60T 2220/04* (2013.01)

(58) Field of Classification Search
CPC ...... B60T 17/22; B60T 2220/04; G01D 5/145
See application file for complete search history.

(56) References Cited

U.S. PATENT DOCUMENTS

| 9,266,517 B2* | 2/2016 | Knechtges | B60T 17/22 |
| 9,944,262 B2* | 4/2018 | Kim | B60T 8/409 |
| 11,091,131 B2* | 8/2021 | Lee | B60T 13/686 |
| 11,987,221 B2* | 5/2024 | Hong | G01D 5/12 |

FOREIGN PATENT DOCUMENTS

| CN | 111086494 B | * 10/2021 | ............. B60T 8/409 |
| KR | 10-1315615 B | 10/2013 | |

* cited by examiner

*Primary Examiner* — Reena Aurora
(74) *Attorney, Agent, or Firm* — NovoTechIP International PLLC

(57) ABSTRACT

The present disclosure relates to a brake pedal displacement sensing apparatus. The brake pedal displacement sensing apparatus includes a magnet assembly including a magnet that moves with the same displacement as that of a pedal rod that is moved by operation of a brake pedal, and a sensing unit including a sensor element, which senses a change in a magnetic field of the magnet and generates an electrical signal corresponding to the displacement of the pedal rod, and a connector, which is electrically connected to an electronic control unit (ECU) circuit board included in a brake control ECU to transmit the electrical signal from the sensor element to the brake control ECU.

20 Claims, 6 Drawing Sheets

APPARATUS FOR SENSING DISPLACEMENT OF BRAKE PEDAL

CROSS-REFERENCE TO RELATED APPLICATIONS

This application claims the benefit under 35 U.S.C. § 119(a) of priority to Korean Patent Application No. 10-2022-0121650, filed on Sep. 26, 2022 in the Korean Intellectual Property Office, the entire disclosure of which is incorporated herein by reference for all purposes.

TECHNICAL FIELD

Exemplary embodiments of the present disclosure relate to a brake pedal displacement sensing apparatus for sensing a displacement of a brake pedal when the brake pedal is depressed in an electric brake system.

BACKGROUND

A vehicle has a brake device for braking. The brake device is configured to brake the vehicle by supplying hydraulic pressure for braking to wheel cylinders through a connected booster when a driver presses a brake pedal.

Recently, there is a general trend in that an electric brake device is applied to a vehicle. In the electric brake device, when a driver presses a brake pedal, a brake pedal displacement sensing apparatus detects a displacement of the brake pedal, and generates an electrical signal. On the basis of this electrical signal, hydraulic pressure required for braking is supplied to wheel cylinders to enable a precise control of braking force.

In a conventional brake pedal displacement sensing apparatus, a sensor for detecting a displacement of a brake pedal is installed on the brake pedal. In this case, there is a problem when an error between the displacement of the brake pedal detected by the sensor and an actual displacement increases. In addition, there is another problem where the brake pedal displacement sensing apparatus is vulnerable to a breakdown and has a high manufacturing cost.

The Background technology of the present disclosure is disclosed in Korean Patent No. 10-1315615 (registered on Sep. 30, 2013 and entitled "INSTALLATION STRUCTURE OF A PEDAL STROKE SENSOR").

SUMMARY

Various embodiments are directed to a brake pedal displacement sensing apparatus in which the accuracy of measuring a displacement of a brake pedal is improved, a structure of electrical connection to an electronic control unit (ECU) is simple, and the reliability of the electrical connection is improved.

In an embodiment, a brake pedal displacement sensing apparatus may include: a magnet assembly including a magnet that moves with the same displacement as a displacement of a pedal rod that is moved by operation of a brake pedal; and a sensing unit including a sensor element, which senses a change in a magnetic field of the magnet and generates an electrical signal corresponding to the displacement of the pedal rod, and a connector, which is electrically connected to an ECU circuit board included in a brake control ECU, the connector to transmit the electrical signal to the brake control ECU.

The magnet assembly may further include: a piston coupling unit connected to a piston of a master cylinder; and a magnet mounting unit on which the magnet is mounted.

The magnet assembly may further include a connection leg unit configured to connect the piston coupling unit and the magnet mounting unit, and extending in parallel with a movement direction of the pedal rod.

The sensing unit may further include a sensor circuit board on which the sensor element is mounted and to which the connector is electrically connected.

The sensor circuit board may be disposed above the magnet, and the sensor element may be mounted on a lower side surface of the sensor circuit board to face the magnet.

The sensor circuit board may extend in a direction crossing a movement direction of the magnet.

The connector may include a plurality of connection springs having a first end in elastic contact with the ECU circuit board and a second opposite end in contact with the sensor circuit board.

The plurality of connection springs may be coil springs, and a normal line of the ECU circuit board and a longitudinal direction of the connection springs may be parallel with each other.

Each of the connection springs may include: a spring core formed of a steel material; and a conductive layer formed of a silver (Ag) material stacked on a surface of the spring core.

Each of the connection springs may have a larger diameter portion and a smaller diameter portion, the larger diameter portion may be electrically connected to the sensor circuit board, and the smaller diameter portion may be electrically connected to the ECU circuit board.

The sensing unit may further include a sensing unit housing installed in a hydraulic block with a master cylinder and supporting the sensor circuit board.

The sensing unit may further include a sensing unit cap coupled to the sensing unit housing and having an inner space in which the plurality of connection springs are accommodated.

A first side of the sensing unit cap may be opened so that the sensing unit housing and the plurality of connection springs are inserted into the inner space, and a plurality of spring through-holes corresponding to the plurality of connection springs may be formed on a second side of the sensing unit cap.

The sensing unit may further include a spring holder fitted into the sensing unit cap, and having a plurality of spring mounting grooves into which the plurality of connection springs are inserted and respectively mounted.

The magnet and the sensor element may be disposed inside the hydraulic block, and the plurality of connection springs may be disposed outside the hydraulic block.

According to the present disclosure, the brake pedal displacement sensing apparatus includes the sensor element disposed to closely face the magnet, and a path and structure through which the electrical signal corresponding to the displacement of the pedal rod generated by the sensor element is transmitted to the brake control ECU are simple. Accordingly, the precision and reliability of measuring the displacement of the brake pedal are improved, and the manufacturing cost of the brake pedal displacement sensing apparatus is reduced.

DETAILED DESCRIPTION

Hereinafter, a brake pedal displacement sensing apparatus will be described in detail with reference to the accompanying drawings through various exemplary embodiments. Terms to be used in this specification are used to properly describe preferred embodiments of the present disclosure, and may be changed depending on a user or operator's intention or practice in the field to which the present disclosure pertains. Accordingly, such terms should be defined based on the overall contents of this specification.

Figure 1:
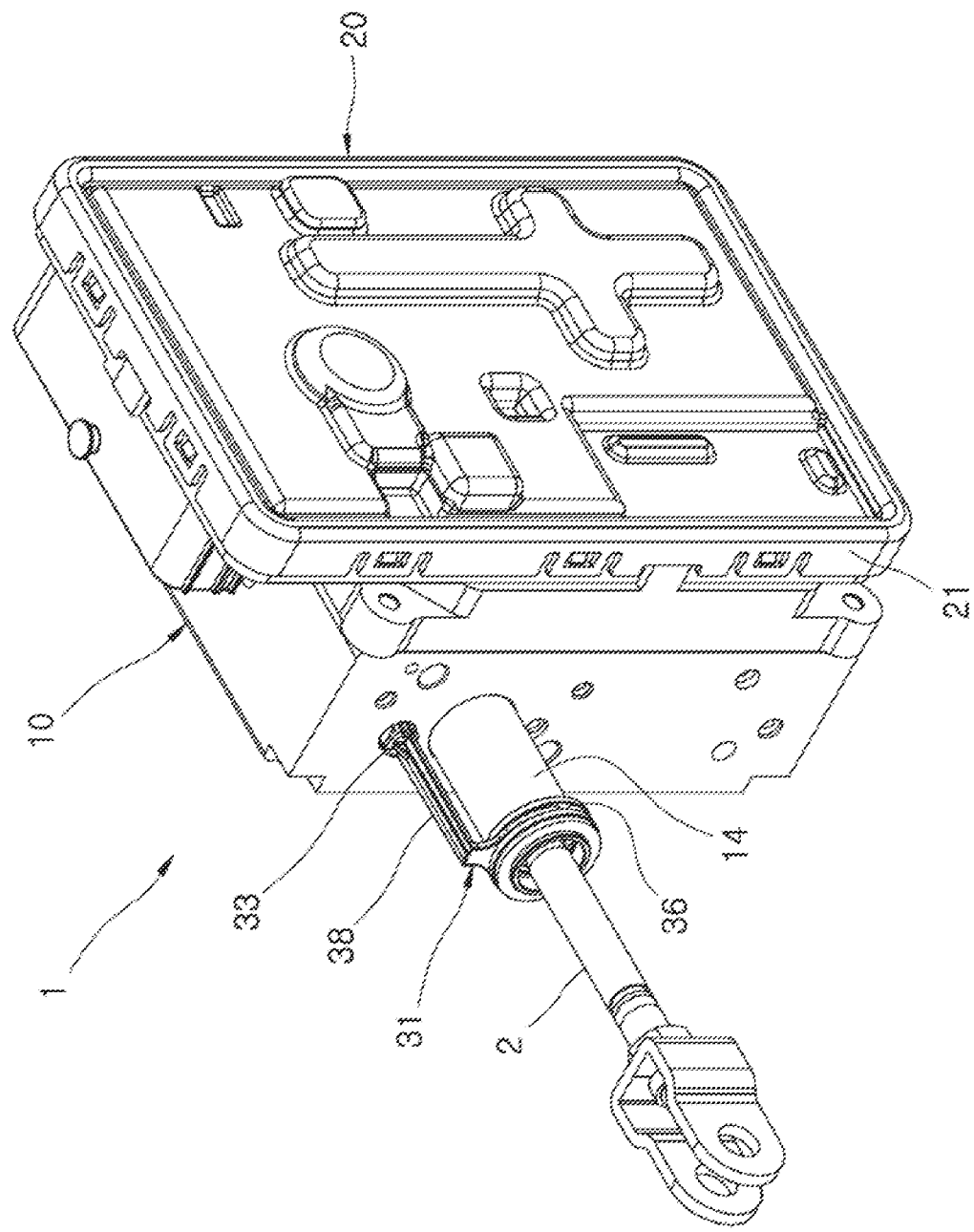
FIG. 1 is a perspective view illustrating an electric brake device having a brake pedal displacement sensing apparatus according to an embodiment of the present disclosure, in a state in which an ECU is coupled to a hydraulic block.
Figure 2:
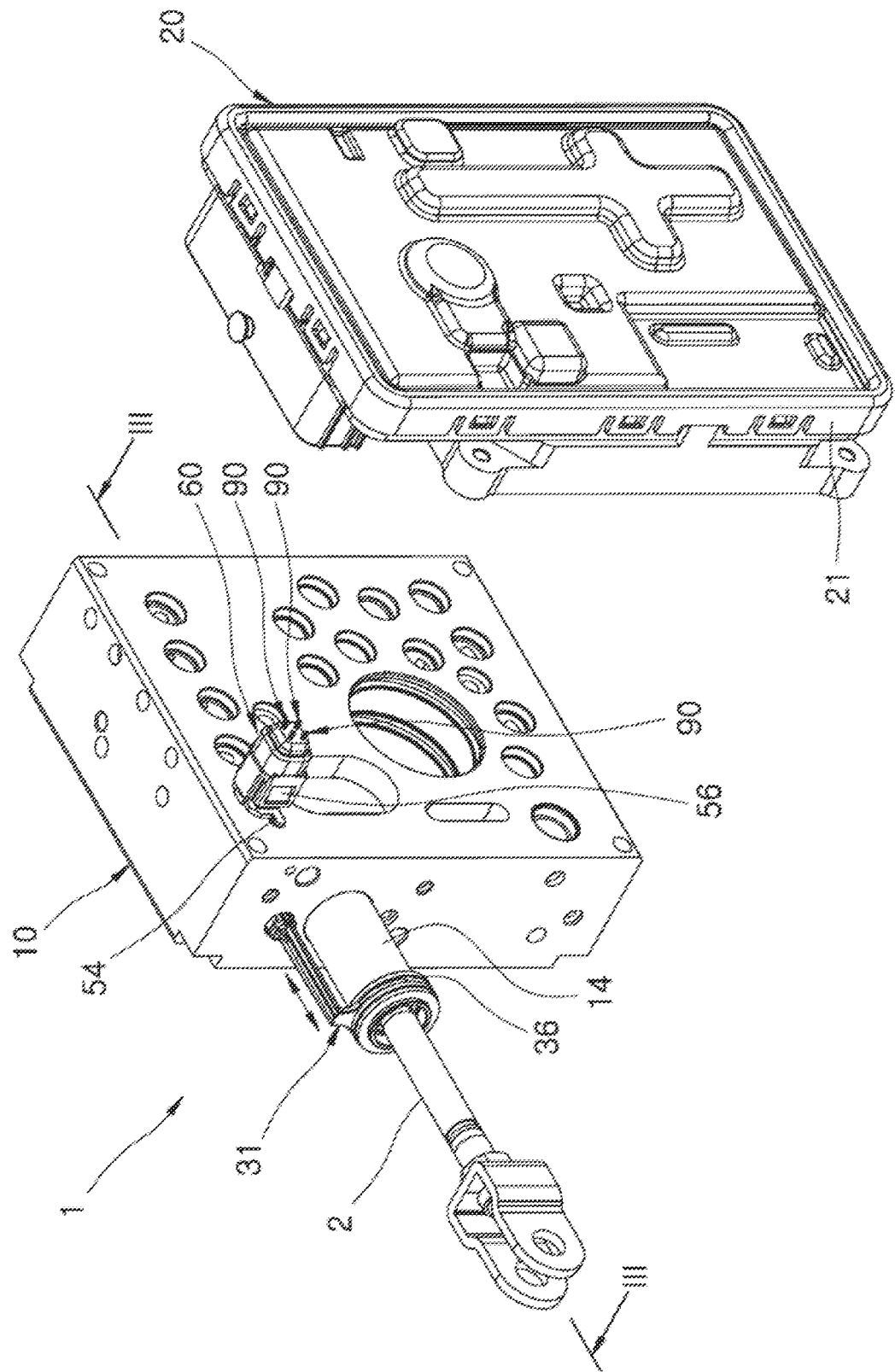
FIG. 2 is a perspective view illustrating an electric brake device having a brake pedal displacement sensing apparatus according to an embodiment of the present disclosure, in a state in which an ECU is decoupled from a hydraulic block.
Figure 3:
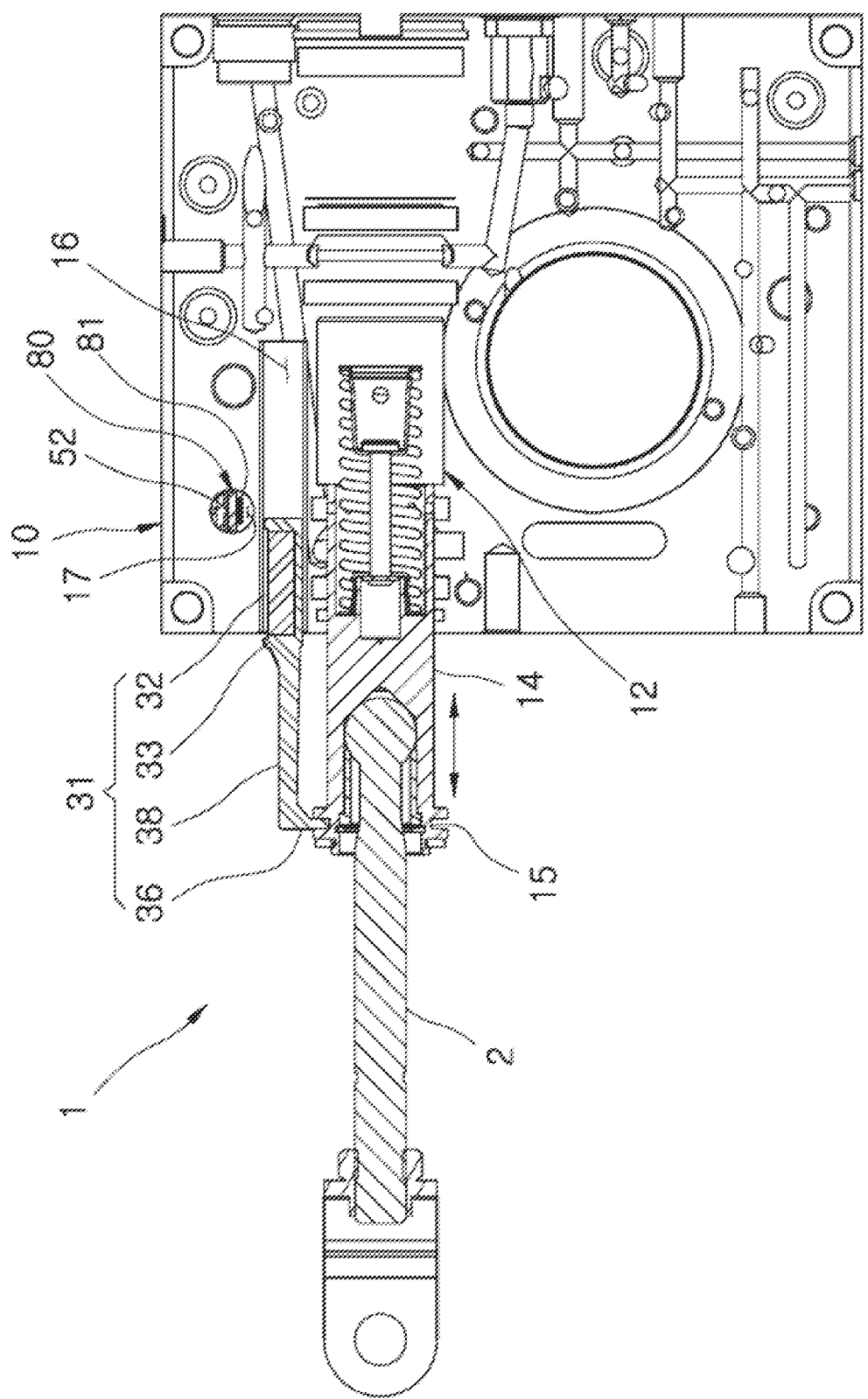
FIG. 3 is a cross-sectional view illustrating the electric brake device taken along line III-III illustrated in FIG. 2.
Figure 4:
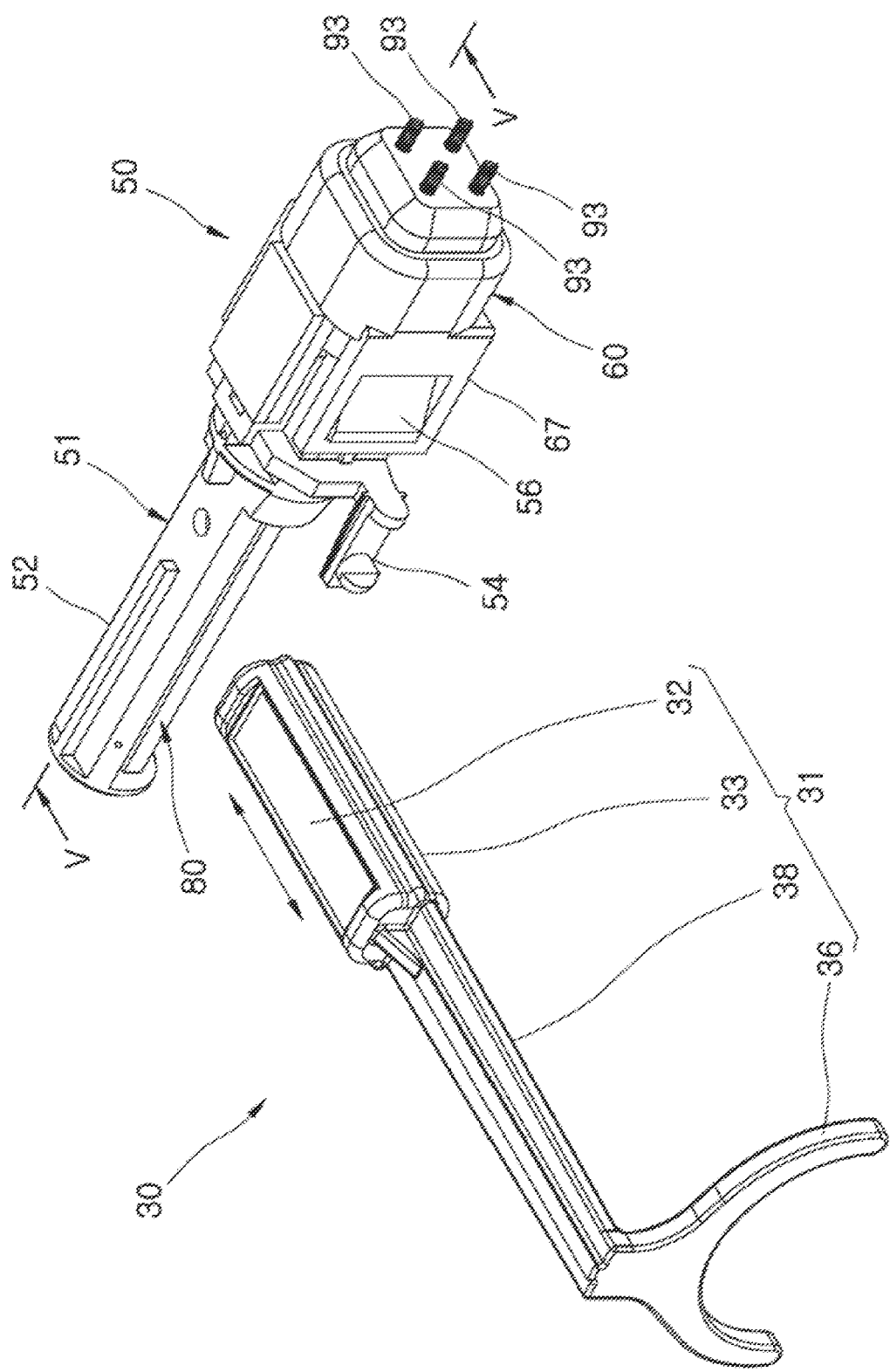
FIG. 4 is a perspective view illustrating a brake pedal displacement sensing apparatus according to an embodiment of the present disclosure.
Figure 5:
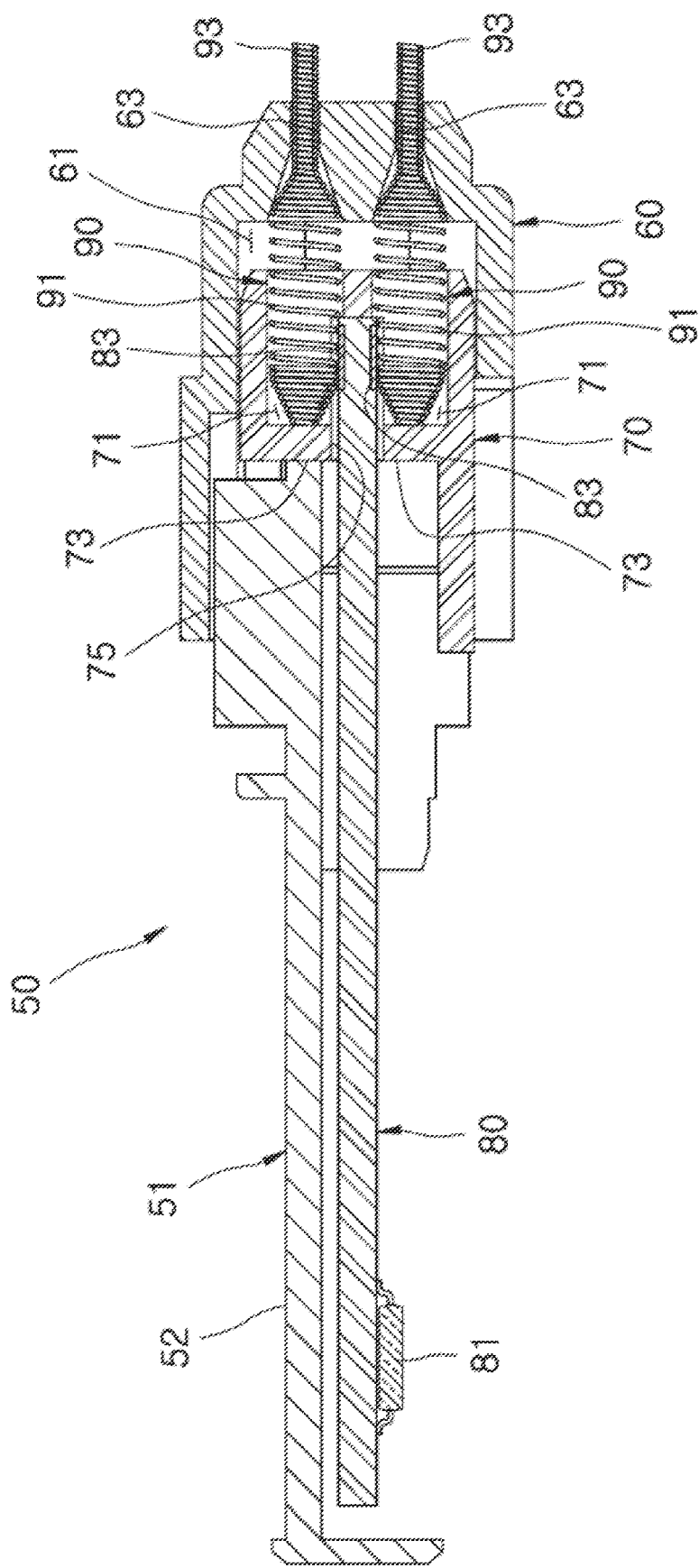
FIG. 5 is a cross-sectional view illustrating a sensing unit taken along line V-V illustrated in FIG. 4.
Figure 6:
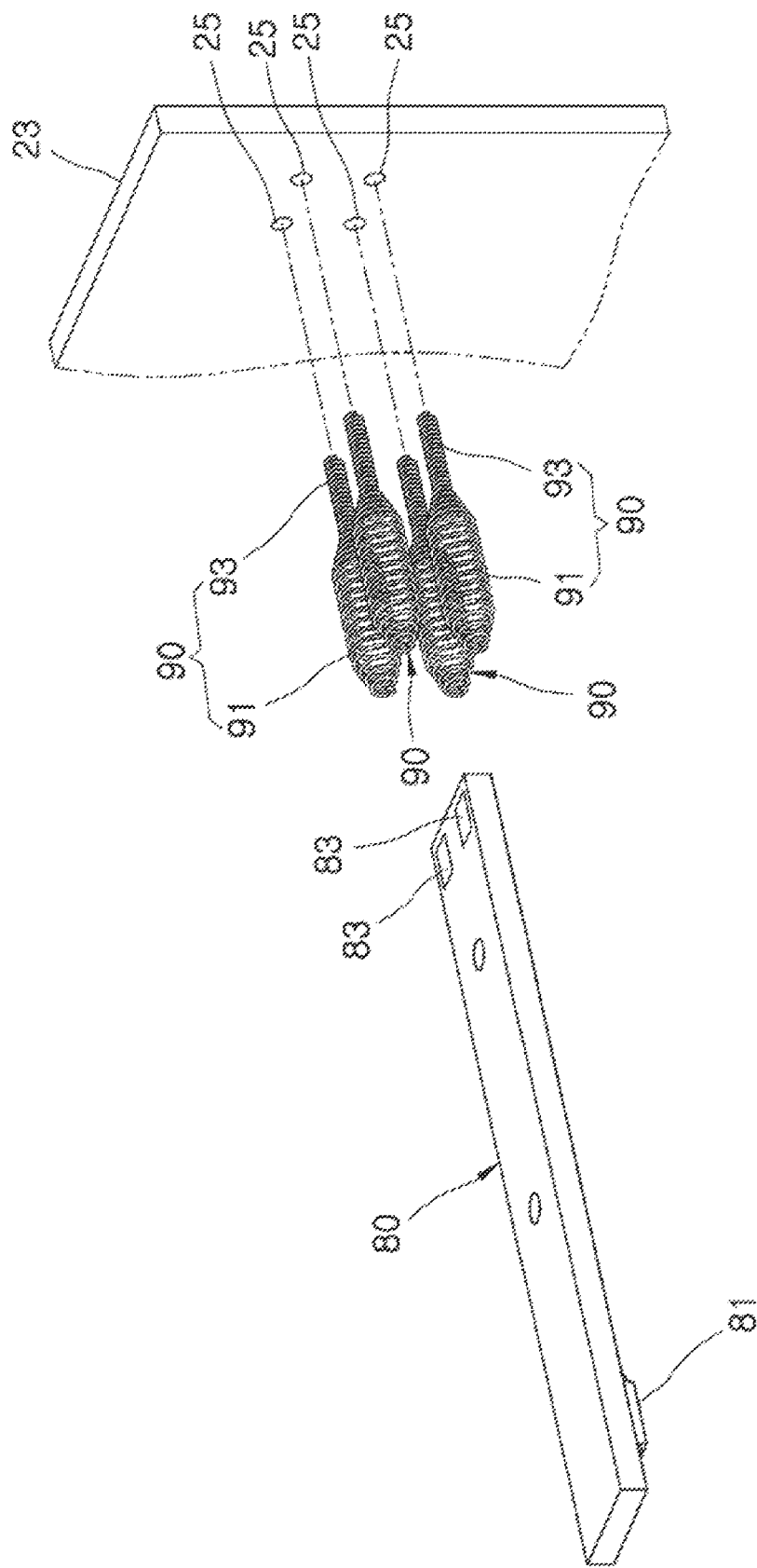
FIG. 6 is a perspective view illustrating a circuit board and a spring connector of the sensing unit and a circuit board of the ECU illustrated in FIG. 2.

FIG. 1 is a perspective view illustrating an electric brake device having a brake pedal displacement sensing apparatus according to an embodiment of the present disclosure, in a state in which an ECU is coupled to a hydraulic block. FIG. 2 is a perspective view illustrating an electric brake device having a brake pedal displacement sensing apparatus according to an embodiment of the present disclosure, in a state in which an ECU is decoupled from a hydraulic block. FIG. 3 is a cross-sectional view illustrating the electric brake device taken along line III-III illustrated in FIG. 2. FIG. 4 is a perspective view illustrating a brake pedal displacement sensing apparatus according to an embodiment of the present disclosure. FIG. 5 is a cross-sectional view illustrating a sensing unit taken along line V-V illustrated in FIG. 4. FIG. 6 is a perspective view illustrating a circuit board and a spring connector of the sensing unit and a circuit board of the ECU illustrated in FIG. 2.

Referring to FIGS. 1 to 6, a brake pedal displacement sensing apparatus 30 according to the present disclosure detects and measures a displacement of a brake pedal (not illustrated) when a driver presses the brake pedal in an electric brake device 1.

The brake pedal displacement sensing apparatus 30 includes a magnet assembly 31 and a sensing unit 50.

The electric brake device 1 may include a pedal rod 2, a master cylinder 12, a hydraulic block 10, a brake control electronic control unit (ECU) 20, and the brake pedal displacement sensing apparatus 30.

The master cylinder 12 may be disposed inside the hydraulic block 10. A piston 14 of the master cylinder 12 protrudes forward of the hydraulic block 10. The pedal rod 2 may include a front end connected to the brake pedal (not illustrated), and a rear end connected to the piston 14.

As illustrated by the arrows in FIGS. 2 and 3, when the driver presses the brake pedal, the pedal rod 2 and the piston 14 move in a direction of being inserted into the hydraulic block 10, and when the driver does not press the brake pedal, the pedal rod 2 and the piston 14 move in a direction of protruding from the hydraulic block 10 so as to return to an original position.

The brake control ECU 20 may be disposed on one side of the hydraulic block 10 to cover one side of the hydraulic block 10. The brake control ECU 20 may include an ECU housing 21 fixedly coupled to the hydraulic block 10, and an ECU circuit board 23 disposed inside the ECU housing 21.

The magnet assembly 31 moves with the same displacement as the displacement of the pedal rod 2 moving by operation of the brake pedal, as illustrated by the arrow in FIG. 4.

The magnet assembly 31 may include a magnet 32, that is, a permanent magnet, and a magnet bracket that supports the magnet 32 and is coupled to the piston 14. The magnet bracket may include a piston coupling unit 36, a magnet mounting unit 33, and a connection leg unit 38 that are integrally formed.

The piston coupling unit 36 is a semicircular unit coupled to the piston 14, and is fitted into a coupling unit fitting groove 15 formed in a ring shape on an outer circumferential surface of the piston 14.

The magnet mounting unit 33 is a unit on which the magnet 32 is mounted. A mounting groove in which the magnet 32 is mounted without shaking, and of which an upper side is exposed, may be formed in the magnet mounting unit 33. The connection leg unit 38 is a unit connecting the piston coupling unit 36 and the magnet mounting unit 33, and extends in parallel with the movement direction of the pedal rod 2.

A magnet mounting unit slide groove 16, into which the magnet mounting unit 33 is fitted, may be formed in the hydraulic block 10. The magnet mounting unit slide groove 16 extends slightly longer than the maximum stroke of the pedal rod 2 so that the magnet mounting unit 33 can move inside the hydraulic block 10 in the same distance and direction as the pedal rod 2 moves.

The sensing unit 50 may include a sensor element 81, a sensor circuit board 80, a connector, a sensing unit housing 51, a sensing unit cap 60, and a spring holder 70. The sensor element 81, which is an element in the form of a semiconductor chip package, senses a change in a magnetic field caused by the movement of the magnet 32, and generates an electrical signal corresponding to the displacement of the pedal rod 2. The sensor element 81 may be a hall sensor element.

The sensor element 81 is mounted on the sensor circuit board 80 so as to be electrically connected to each other. The sensor circuit board 80 is disposed above the magnet 32, and the sensor element 81 is mounted on a lower side surface of the sensor circuit board 80 so as to face the magnet 32. The sensor circuit board 80 extends in a horizontal direction crossing a movement direction of the magnet 32.

The sensor element 81 is mounted on a first side of the sensor circuit board 80 in a longitudinal direction of the sensor circuit board 80. A plurality of connection terminals 83, to which a plurality of connection springs 90 of the connector can be electrically connected, are provided on a second side of the sensor circuit board 80.

The connector includes the plurality of connection springs 90. Each of the connection springs 90 is a coil spring. One side of the connection spring 90 in a longitudinal direction is a smaller diameter portion 93, and the other side is a larger diameter portion 91. The diameter of a spiral orbit of the larger diameter portion 91 forming a coil is larger than the diameter of a spiral orbit of the smaller diameter portion 93.

As illustrated in FIG. 6, in order to transmit the electrical signal generated by the sensor element 81 to the brake control ECU 20, the larger diameter portions 91 of the plurality of connection springs 90 are electrically connected to the sensor circuit board 80, and the smaller diameter portions 93 of the plurality of connection springs 90 are electrically connected to the ECU circuit board 23.

Specifically, tail ends of the smaller diameter portions 93 of the plurality of connection springs 90 are elastically brought into close contact with a plurality of connection terminals 25 provided on a side surface of the ECU circuit board 23 facing the hydraulic block 10. The plurality of connection terminals 25 corresponds to the plurality of connection springs 90 in a one-to-one manner, and are spaced apart from one another. The longitudinal direction of the plurality of connection springs 90 is parallel to the longitudinal direction of the sensor circuit board 80.

In addition, the longitudinal direction of the plurality of connection springs 90 is also parallel to an extending direction of a normal line of the ECU circuit board 23. Accordingly, the plurality of connection springs 90 may be reliably maintained in contact with the ECU circuit board 23 despite external force and vibration transmitted during driving of the vehicle.

As illustrated in FIGS. 5 and 6, side surfaces of the larger diameter portions 91 of the plurality of connection springs 90 are in contact with the plurality of connection terminals 83 of the sensor circuit board 80. The plurality of connection terminals 83 are provided on an upper side surface and a lower side surface of the sensor circuit board 80, correspond to the plurality of connection springs 90 in a one-to-one manner, and are spaced apart from one another.

Each of the connection springs 90 is formed of a metal material so as to be electrically connected to one another. Preferably, each of the connection springs 90 may include a spring core formed of a steel material, and a conductive layer formed of a silver (Ag) material stacked on a surface of the spring core. The spring core allows the connection springs 90 to each have appropriate elasticity and rigidity, and the conductive layer allows a current with minimal resistance to flow through the connection springs 90. The conductive layer may be formed by silver-plating the spring core.

The sensing unit housing 51 supports the sensor circuit board 80, and is installed in the hydraulic block 10. Specifically, the sensing unit housing 51 includes a circuit board support unit 52, a hydraulic block coupling unit 54, and a cap coupling hook unit 56. The circuit board support unit 52 is disposed on an upper side of the sensor circuit board 81 to support the sensor circuit board 80, and extends in a direction parallel to the sensor circuit board 80.

A sensing unit inserting groove 17, extending in a direction crossing a longitudinal direction of the magnet mounting unit slide groove 16, is formed on an upper side of the magnet mounting unit slide groove 16 in the hydraulic block 10. The sensor circuit board 80, the sensor element 81, and the circuit board support unit 52 are inserted into the sensing unit inserting groove 17.

The hydraulic block coupling unit 54 is a unit detachably coupled to the hydraulic block 10 so that the sensing unit 50 is fixedly supported on the hydraulic block 10. The cap coupling hook unit 56 protrudes toward the brake control ECU 20 from one side surface of the hydraulic block 10 without being inserted into the sensing unit inserting groove 17.

The sensing unit cap 60 is coupled to the sensing unit housing 51. An inner space 61, into which an end of the sensing unit housing 51 protruding to the outside of the hydraulic block 10 and the plurality of connection springs 90 are fitted, is formed in the sensing unit cap 60. A first side of the sensing unit cap 60 is opened so that the end of the sensing unit housing 51 and the plurality of connection springs 90 are inserted into the inner space 61 of the sensing unit cap 60. A plurality of spring through-holes 63 corresponding to the plurality of connection springs 90 in a one-to-one manner are formed on a second side of the sensing unit cap 60.

An inner diameter of each of the spring through-holes 63 is greater than the diameter of the spiral orbit of the smaller diameter portion 93 of each of the connection springs 90 and smaller than that of the spiral orbit of the larger diameter portion 91. Accordingly, the larger diameter portions 91 of the plurality of connection springs 90 accommodated in the inner space 61 might not be detached from the inner space 61, and only the smaller diameter portions 93 may protrude to the outside of the sensing unit cap 60 through the spring through-holes 63, and elastically adhere to the ECU circuit board 23.

The sensing unit cap 60 further includes a hook coupling bracket unit 67 to which the cap coupling hook unit 56 is detachably coupled. When the cap coupling hook unit 56 is coupled to the hook coupling bracket unit 67, the sensing unit cap 60 is fixedly coupled to the sensing unit housing 51, and when the cap coupling hook unit 56 is decoupled from the hook coupling bracket unit 67, the sensing unit cap 60 is decoupled from the sensing unit housing 51.

The spring holder 70 supports the plurality of spring holders 70 so that the larger diameter portions 91 of the plurality of connection springs 90 reliably contact the plurality of connection terminals 83 of the sensor circuit board 80, and is fitted into the sensing unit cap 60. Specifically, a plurality of spring mounting grooves 71 into which the larger diameter portions 91 of the plurality of connection springs 90 are fitted one by one are formed in the spring holder 70. The spring holder 70 includes a spring support wall 73 having one side contacting and supporting the larger diameter portions 91 of the connection springs 90 and the other side contacting and supported by the end of the sensing unit housing 51. One side of the plurality of spring mounting grooves 71 are opened to face the plurality of spring through-holes 63. One side of the spring support wall 73 becomes bottom surfaces of the plurality of spring mounting grooves 71.

A circuit board through-hole 75 is formed in the spring support wall 73 so that the other side of the sensor circuit board 80 provided with the plurality of connection terminals 83 penetrates and extends to the larger diameter portions 93. With this configuration, the plurality of connection springs 90 are accommodated in the plurality of spring mounting grooves 71 without being decoupled. In addition, even though the connection springs 90 extend or contract, the side surfaces of the larger diameter portions 91 of the plurality of connection springs 90 are stably in contact with the plurality of connection terminals 83 so as to be electrically connected to the plurality of connection terminals 83.

As illustrated in FIG. 3, the magnet 32, the sensor element 81, and the circuit board support unit 52 of the sensing unit housing 51 are disposed inside the hydraulic block 10. In addition, as can be seen with reference to FIGS. 2 and 5, the sensing unit cap 60, the spring holder 70, and the plurality of connection springs 90 are disposed outside the hydraulic block 10.

The brake pedal displacement sensing apparatus 30 described above includes the sensor element 81 disposed to closely face the magnet 32, and a path and structure through which the electrical signal corresponding to the displacement of the pedal rod 2 generated by the sensor element 81 is transmitted to the brake control ECU 20 are simple. Accordingly, the precision and reliability of measuring the displacement of the brake pedal are improved, and the manufacturing cost of the brake pedal displacement sensing apparatus 30 is reduced.

The present disclosure has been described above with reference to the embodiments illustrated in the accompanying drawings, but the embodiments are merely for illustrative purposes. A person having ordinary knowledge in the art to which the present disclosure pertains will understand that various modifications and other equivalent embodiments are possible from the embodiments. Accordingly, the true technical scope of the present disclosure should be defined by the following claims.

What is claimed is:

1. A brake pedal displacement sensing apparatus comprising:
   a magnet assembly including a magnet that moves with a same displacement as a displacement of a brake pedal rod; and
   a sensing unit including
      a sensor element which senses a change in a magnetic field of the magnet and generates an electrical signal corresponding to the displacement of the brake pedal rod, and
      a connector electrically connected to an electronic control unit (ECU) circuit board included in a brake control ECU, the connector comprising one or more connection springs and being arranged to transmit the electrical signal from the sensor element to the brake control ECU.

2. The brake pedal displacement sensing apparatus of claim 1, wherein the magnet assembly further includes:
   a piston coupling unit connected to a piston of a master cylinder; and
   a magnet mounting unit on which the magnet is mounted.

3. The brake pedal displacement sensing apparatus of claim 2, wherein the magnet assembly further includes a connection leg unit configured to interconnect the piston coupling unit and the magnet mounting unit, the connection leg unit extending in parallel with a direction of movement of the brake pedal rod.

4. The brake pedal displacement sensing apparatus of claim 2, wherein the piston coupling unit comprises a semicircular unit coupled to a fitting groove in an outer circumferential surface of the piston.

5. The brake pedal displacement sensing apparatus of claim 1, wherein the sensing unit further includes a sensor circuit board on which the sensor element is mounted and to which the connector is electrically connected.

6. The brake pedal displacement sensing apparatus of claim 5, wherein the sensor circuit board is disposed above the magnet, and the sensor element is mounted on a lower side surface of the sensor circuit board to face the magnet.

7. The brake pedal displacement sensing apparatus of claim 6, wherein the sensor circuit board extends in a direction crossing a direction of movement of the magnet.

8. The brake pedal displacement sensing apparatus of claim 1, further comprising a hydraulic block including a magnet mounting unit slide groove therein to receive a magnet mounting unit of the magnet assembly, the magnet mounting unit slide groove being longer than a maximum stroke of the brake pedal rod so that the magnet mounting unit is movable inside the hydraulic block.

9. The brake pedal displacement sensing apparatus of claim 1, wherein the sensor element comprises a semiconductor chip package.

10. The brake pedal displacement sensing apparatus of claim 1, wherein the sensor element is disposed on a sensor circuit board, the sensor circuit board further comprising a plurality of connection terminals in electrical connection with the plurality of connection springs.

11. The brake pedal displacement sensing apparatus of claim 1, wherein each of the connection springs has a larger diameter portion and a smaller diameter portion, the larger diameter portion being electrically connected to a sensor circuit board comprising the sensor element, and the smaller diameter portion being electrically connected to the ECU circuit board.

12. A brake pedal displacement sensing apparatus comprising:
   a magnet assembly including a magnet that moves with a same displacement as a displacement of a brake pedal rod; and
   a sensing unit including
      a sensor element which senses a change in a magnetic field of the magnet and generates an electrical signal corresponding to the displacement of the brake pedal rod,
      a connector electrically connected to an electronic control unit (ECU) circuit board included in a brake control ECU, the connector being arranged to transmit the electrical signal from the sensor element to the brake control ECU, and
      a sensor circuit board on which the sensor element is mounted and to which the connector is electrically connected;
      wherein the connector includes a plurality of connection springs each having a first end in elastic contact with the ECU circuit board and a second opposite end in contact with the sensor circuit board.

13. The brake pedal displacement sensing apparatus of claim 12, wherein the plurality of connection springs are coil springs, and a normal line of the ECU circuit board and a longitudinal direction of the connection springs are in parallel with each other.

14. The brake pedal displacement sensing apparatus of claim 12, wherein each of the connection springs includes:
   a spring core formed of a steel material; and
   a conductive layer formed of a silver (Ag) material stacked on a surface of the spring core.

15. The brake pedal displacement sensing apparatus of claim 12, wherein each of the connection springs has a larger diameter portion and a smaller diameter portion, the larger diameter portion being electrically connected to the sensor circuit board, and the smaller diameter portion being electrically connected to the ECU circuit board.

16. The brake pedal displacement sensing apparatus of claim 12, wherein the sensing unit further includes a sensing unit housing installed in a hydraulic block with a master cylinder and supporting the sensor circuit board.

17. The brake pedal displacement sensing apparatus of claim 16, wherein the sensing unit further includes a sensing unit cap coupled to the sensing unit housing and having an inner space in which the plurality of connection springs are accommodated.

18. The brake pedal displacement sensing apparatus of claim 17, wherein a first side of the sensing unit cap is open with the sensing unit housing and the plurality of connection springs being inserted into the inner space, and a plurality of spring through-holes corresponding to the plurality of connection springs being formed on a second side of the sensing unit cap.

19. The brake pedal displacement sensing apparatus of claim 17, wherein the sensing unit further includes a spring holder fitted into the sensing unit cap, the sensing unit also having a plurality of spring mounting grooves into which the plurality of connection springs are inserted and respectively mounted.

20. The brake pedal displacement sensing apparatus of claim 16, wherein the magnet and the sensor element are disposed inside the hydraulic block, and the plurality of connection springs are disposed outside the hydraulic block.

* * * * *